United States Patent
Krug et al.

(10) Patent No.: US 9,458,938 B2
(45) Date of Patent: Oct. 4, 2016

(54) MOVABLE INSTALLATION PARTS OR MACHINE PARTS WITH A COVER DEVICE

(71) Applicant: Hübner GmbH & Co. KG, Kassel (DE)

(72) Inventors: Lars Krug, Immenhausen (DE); Thomas Busch, Reinhardshagen (DE)

(73) Assignee: Hübner GmbH & Co. KG, Kassel (DE)

( * ) Notice: Subject to any disclaimer, the term of this patent is extended or adjusted under 35 U.S.C. 154(b) by 48 days.

(21) Appl. No.: 14/285,120

(22) Filed: May 22, 2014

(65) Prior Publication Data

US 2014/0361498 A1 Dec. 11, 2014

(30) Foreign Application Priority Data

Jun. 7, 2013 (DE) .................... 20 2013 005 226 U

(51) Int. Cl.
*F16J 15/50* (2006.01)
*B23Q 11/08* (2006.01)

(52) U.S. Cl.
CPC ............ *F16J 15/50* (2013.01); *B23Q 11/0816* (2013.01)

(58) Field of Classification Search
CPC ................ F16J 3/00; F16J 3/04; F16J 3/041; F16J 3/043
See application file for complete search history.

(56) References Cited

U.S. PATENT DOCUMENTS

| 8,669,193 B2 | 3/2014 | Hubner et al. | |
| 2012/0009835 A1* | 1/2012 | Hubner | B32B 25/10 442/1 |
| 2014/0291938 A1* | 10/2014 | Koukal | B60D 5/003 277/345 |

FOREIGN PATENT DOCUMENTS

| CN | 2474378 Y | 1/2002 | |
| CN | 102328669 A | 1/2012 | |
| DE | 19909129 A1 * | 9/2000 | ............. B60D 5/003 |
| DE | 10324524 B3 | 7/2004 | |
| DE | 102011110873 A1 * | 2/2013 | ............... B60D 5/00 |
| EP | 2546119 A2 | 1/2013 | |
| NL | DE 4007862 A1 * | 9/1990 | ......... B23Q 11/0816 |

OTHER PUBLICATIONS

Office Action from co-pending international patent application Serial No. CN201410218560.4 issued Nov. 25, 2015.

* cited by examiner

*Primary Examiner* — Gilbert Lee
(74) *Attorney, Agent, or Firm* — Dinsmore & Shohl LLP; Douglas L. Wathen

(57) ABSTRACT

The object of the invention is a cover device (1) for moving system or machine parts such as e.g. machine bellows, axle boots etc., the cover device (1) having a reinforcing element, the reinforcing element having a plurality of threads or yarns, the threads or yarns featuring a reticulated silicone-rubber.

15 Claims, 5 Drawing Sheets

MOVABLE INSTALLATION PARTS OR MACHINE PARTS WITH A COVER DEVICE

CROSS REFERENCE TO RELATED APPLICATIONS

This application claims priority and is a continuation-in-part of German utility model No. 20 2013 005 226.0, filed Jun. 7, 2013.

FIELD OF THE INVENTION

The present invention relates to movable installation parts or machine parts, e.g. a machine bellow, an axle boot, with a cover device, the cover device having a reinforcing element, the reinforcing element having a plurality of threads or yarns.

However, moving system parts not only include e.g. telescopic slides in machines that are covered by machine bellows but also canopy roofs of air passenger bridges or stairs with a bellows.

As has already been explained, cover devices and more specifically circumferential cover devices for moving system or machine parts are known under the term machine bellows. Such machine bellows enclose moving parts of a machine or system and are frequently designed as pleated bellows. The slide track of a machine slide, for example, is often covered by such machine bellows in order to protect the slide track against soiling by shavings or fluids. As has already been explained, such bellows are usually designed as pleated bellows. Such pleated bellows are manufactured by bending the fabric material forming the pleated bellows in the manner of a concertina. This fabric material can also be coated in an elastomer, more specifically for sealing it against fluids.

Axle boots designed as bellows with a circular cross-section are also known. Corrugated or pleated bellows are used here, the type of the bellows being determined by the intended use. Such bellows in form of axle boots usually consist of one or several reinforcing elements that are coated with an elastomer on both sides, the forming operation being carried out by vulcanisation.

Moving system parts designed as bellows are also known in the form of canopy roofs of air passenger bridges or stairs.

All the previously mentioned cover devices have in common that their production is very complex. This is more specifically true with regard to the production of the concertina-type design of machine bellows and, with axle boots for instance, to the vulcanisation of such an axle boot in a vulcanisation mould.

Sooner or later, cracks appear in the area of the bend, more specifically in machine bellows that are designed as pleated bellows, making it necessary to replace such a machine bellows.

SUMMARY OF THE INVENTION

The problem underlying the invention therefore consists in providing a cover device for system or machine parts of the type mentioned in the introduction that is substantially easier to manufacture and consequently less expensive and additionally subject to little wear.

In order to solve the problem, it is proposed according to the invention that the reinforcing element has threads made of a cross-linked silicone rubber. Threads made of a cross-linked silicone rubber have an increased extensibility of several 100% relative to the initial length of such a thread. A reinforcing element made of such a thread, more specifically in form of a woven fabric, a warp-knitted fabric or a weft-knitted fabric, also has a high extensibility of 180% to about 280%. The immediate consequence of this is that due to the increased extensibility, a cover device designed as a machine bellows for example that is manufactured from a reinforcing element with threads based on a silicone rubber does not necessarily require pleats or corrugations in order to provide the necessary extension length. The same correspondingly applies to cover devices designed as axle boots or to the bellows of a canopy roof of an air passenger stair or bridge.

According to another feature of the invention, it is provided that the reinforcing element is coated with an elastomer, more specifically based on a cross-linked silicone rubber, in order to be able to provide the appropriate impermeability in addition to the increased extension length. In doing so, it is advantageous if the material for the coating is the same as the material for manufacturing the threads, in order to be able to provide a substantially identical extensibility to the coating on the one hand and the reinforcing element on the other hand. This means that the extensibility of the coating must be at least as high as the extensibility of the reinforcing element, because cracks would otherwise form during use, which would lead to liquid entry.

According to another feature of the invention, it is provided that the cover device has a U-shaped, box-shaped or sleeve-shaped cross-section. In case of a U-shaped cross-section, the cover device can be open on its underside. Box-shaped or sleeve-shaped cross-sections can be closed on all sides.

In a cover device of the type described above, it is additionally advantageous that such a silicone-based cover device with at least one planar reinforcing element not only has little weight but also increased elasticity or extensibility and is additionally weather-proof, more specifically UV-proof, which is more specifically of interest for canopy roofs of air passenger bridges or stairs.

The threads or yarns of the reinforcement material are made of cross-linked silicone rubber or are manufactured based on a cross-linked silicone rubber and more specifically have a module value in the range of 10 to $100^{cN}/800\%$ extension, preferably 20 to $80^{cN}/800\%$. This means that the individual threads or yarns are designed to have rubber elasticity and, when forming a woven fabric, a knitted fabric or a non-crimp fabric, have a high elasticity more specifically in two spatial directions. More specifically when the reinforcing element is a woven fabric, it can be provided that the warp threads or the weft threads are manufactured from such an elastic material in the above module range. If only the weft threads for example are made of such a highly elastic material while using a material with low elasticity for the warp threads, a more or less mono-directional elastic fabric is produced as opposed to a bi-directional elastic fabric, in which the weft threads as well as the warp threads have a high elasticity.

According to another feature of the invention, it is provided that the threads have a sheath made of a synthetic material that does not correspond to the material of the thread. This must be seen against the following background: threads made of a silicone elastomer are particularly difficult to process, more specifically when weaving or knitting. This is due to the fact that such threads made of a silicone elastomer have a very slip-resistant surface. By using a sheath made of a synthetic material, the friction at the surface of such a thread or yarn can be reduced by choosing the suitable synthetic material. In this regard it is additionally provided that the sheath is formed by another thread surrounding the thread, i.e. the core. This means that the thread (core) made of a silicone elastomer for example and which is surrounded by a thread made of polyamide or polyethylene, has very good sliding properties. It is also conceivable to use a fire resistant material such as e.g. aramides, glass fibres or carbon fibres for the surrounding synthetic material, more specifically for the surrounding thread, or to choose a suitable synthetic material that can be applied onto the thread, e.g. by dip coating, which means that the silicone thread obtains a slipping surface, which allows processing such a thread to form a woven fabric, knitted fabric or non-crimp fabric. Such threads made of aramide, glass fibres or carbon fibres for sheathing the silicone thread have a reduced surface friction in addition to fire-resisting properties. Therefore, a planar reinforcing element produced in this manner is not only highly elastic but also has excellent fire-resisting properties.

A circumferential cover device or bellows with a box-shaped or U-shaped or also sleeve-shaped cross-section with individual pleats or corrugations. It has been proven that, depending on each specific application, due to the increased extensibility of the reinforcing element, more specifically when it is made of silicone threads, less than half the corrugations or pleats are required as compared to a customary bellows. This means that the material of the bellow itself provides a considerable part of the extension, since the threads themselves have an extensibility of several 100%, depending on the tensile force exerted onto the thread or the yarn. Even when such threads or yarns have been processed into planar reinforcing elements, these reinforcing elements still have an extensibility ranging from 100 to 280%. Under certain circumstances, such a cover device can also completely dispense with pleats or corrugations, which means that such a cover device has a smooth surface on its circumference.

It is known to equip bellows, namely corrugated or pleated bellows, serving as cover devices, with bellows frames, in order to provide them with a rigid configuration. The reason for this is more specifically that the bellows must not sag. The rigidity of the cover device as such varies along the length of the cover device. In the middle between the clamped ends of the cover device, the rigidity is lowest. However, the rigidity can also depend on other factors, e.g. of external stresses. This means that along their length individual cover devices can indeed have different local requirements with regard to their rigidity.

When the cover device has at least one profile that is detachably connectable to the cover, it is possible to attach the profile in places where it is necessary for achieving the desired rigidity. In this context, a detachable connection must be understood as a connection, which allows detaching and reconnecting the individual parts forming the connection almost as often as required without causing damage or destruction.

The detachable connection of the profiles allows choosing the distance between the profiles to be variable, namely independently from their manufacture, because the profiles are only attached during the assembly. In this respect, the cover can be manufactured by the meter as a woven fabric or as a knit fabric of any length, cut and sewed up or glued e.g. to form a U-shaped, box-shaped or even structure. Only then the profiles are attached only afterward. This allows for a cheap manufacture. In contrast, profile frames are typically installed at regular intervals immediately during the manufacturing process. In this regard, the possibility of variably attaching the profiles also means that a greater number of profiles can be provided in those places where the lowest rigidity of the cover device is to be expected than in the areas that are more rigid, as is the case in the immediate vicinity of the connection of the cover device to the respective machine or system part. This means that the number of profiles increases toward the centre of the cover device and decreases toward the ends. In this regard, the total number of profiles can remain the same, but by varying the arrangement of the profiles, the cover can be adapted individually and to the application conditions.

Thus it is more specifically provided that the profile element has a groove, namely more specifically a circumferential groove. The cover, e.g. a fabric that can be a woven fabric with an elastomer, e.g. a silicone-coated warp-knitted fabric or weft-knitted fabric, can be fixed to the profile element a piping element so that it is enclosed in the groove. From this, it is clear that an appropriate profile element is attachable in any place of the cover device.

In this context, it is provided that the profile element is made of metal, more specifically aluminium, or a plastic material. The piping element that is receivable by the profile element is either insertable into the profile element or can be pressed into the profile element. It has proven advantageous if the piping element is rubber-elastic and advantageously forms a closed ring, since it can then be circumferentially pressed into the groove of the profile element. In order to facilitate the pressing process, the piping element can advantageously have a hollow space. Another advantage of this design is that a divided profile element is held together by the closed piping element. Usually, the profile element is to be opened in the area of the floor, in order to be able to pull the cover device over the element to be covered, e.g. a slide. Thanks to the closed rubber-elastic piping element, the ends of the profile elements are held together, so that separate closing means can be dispensed with.

BRIEF DESCRIPTION OF THE DRAWINGS

In the following, the invention is exemplarily described as a machine bellows based on the drawings.

DETAILED DESCRIPTION OF THE DRAWINGS

Figure 1:
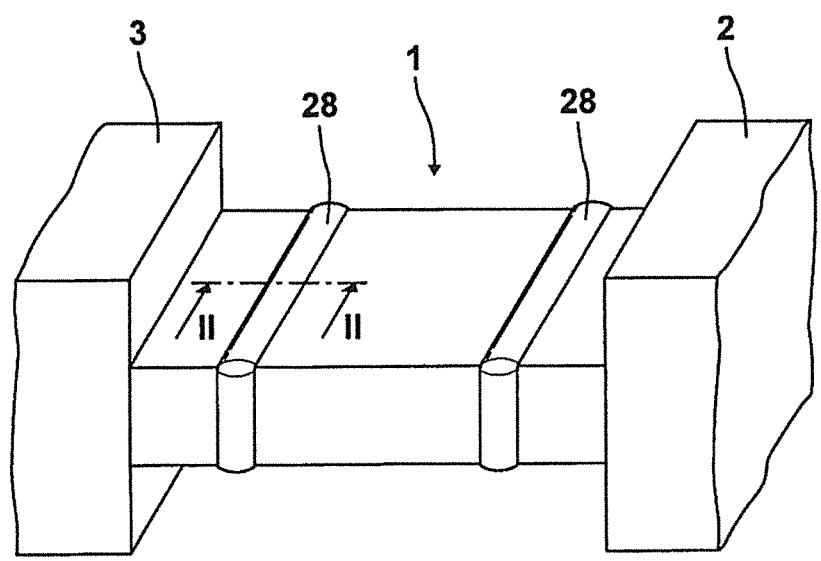
FIG. 1 is a perspective view of a bellows-type cover device.

According to FIG. 1, a cover device labelled 1 as a whole is disposed e.g. in form of a machine bellows between the two machine parts 2 and 3.

Figure 2:
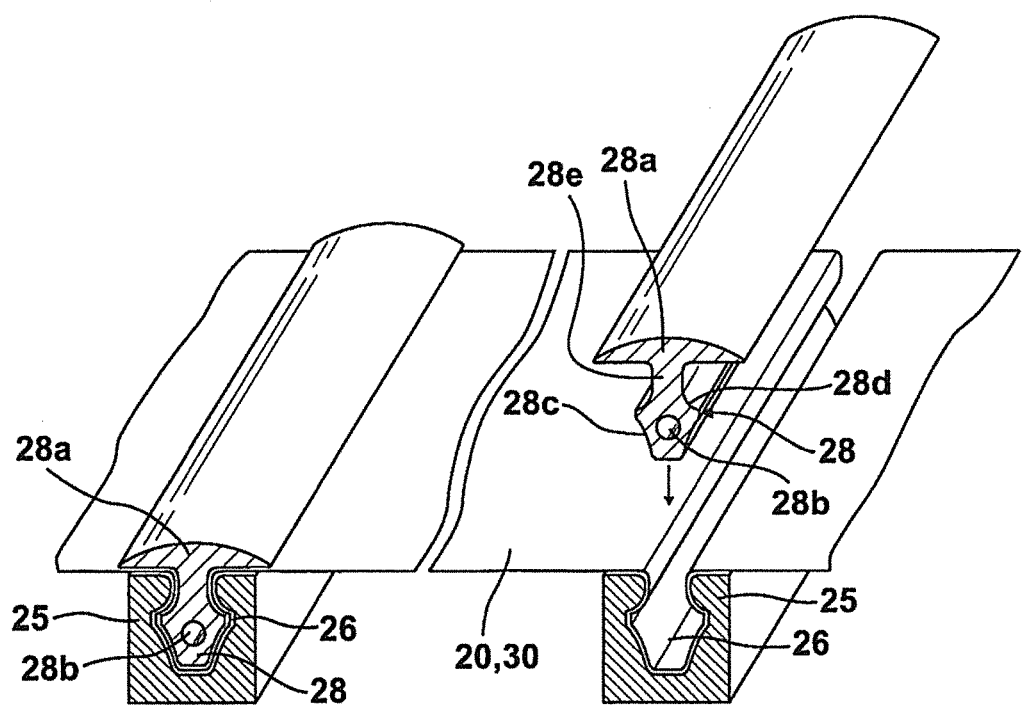
FIG. 2 is a cross sectional view of the cover device with the profile elements connected to the cover in a sectional view.

In this context, it can be gathered from FIG. 2 that the profile element 25 features a groove 26, into which the fabric panel 20 of the cover device 1 is inserted and is fastened in the groove 26 of the profile element 25 by a piping element 28. The piping element 28 is advantageously designed to be rubber-elastic and is moreover advantageously pressed into the groove 26.

The piping element 28 advantageously has a piping head 28a with an umbrella-like cross-section, which ensures that no humidity or dirt can penetrate into the groove 26 of the profile element. In order to ensure that the piping head 28a can slide on the fabric panel 20 coated with an elastomer, the underside of the piping head 28a is advantageously coated with a PTFE. The anchor-shaped piping element 28 has a tapered piping foot 28c, which delimits a substantially horizontal flange 28d. The piping foot 28c transitions toward the piping head 28a via a neck 28e.

The design of the tapered piping foot and the design of the almost horizontal flange facilitates the engagement and hinders the detachment under tensile load. In order to facilitate the pressing process, the piping element can have a hollow space 28b in the area of the piping foot.

Figure 7:
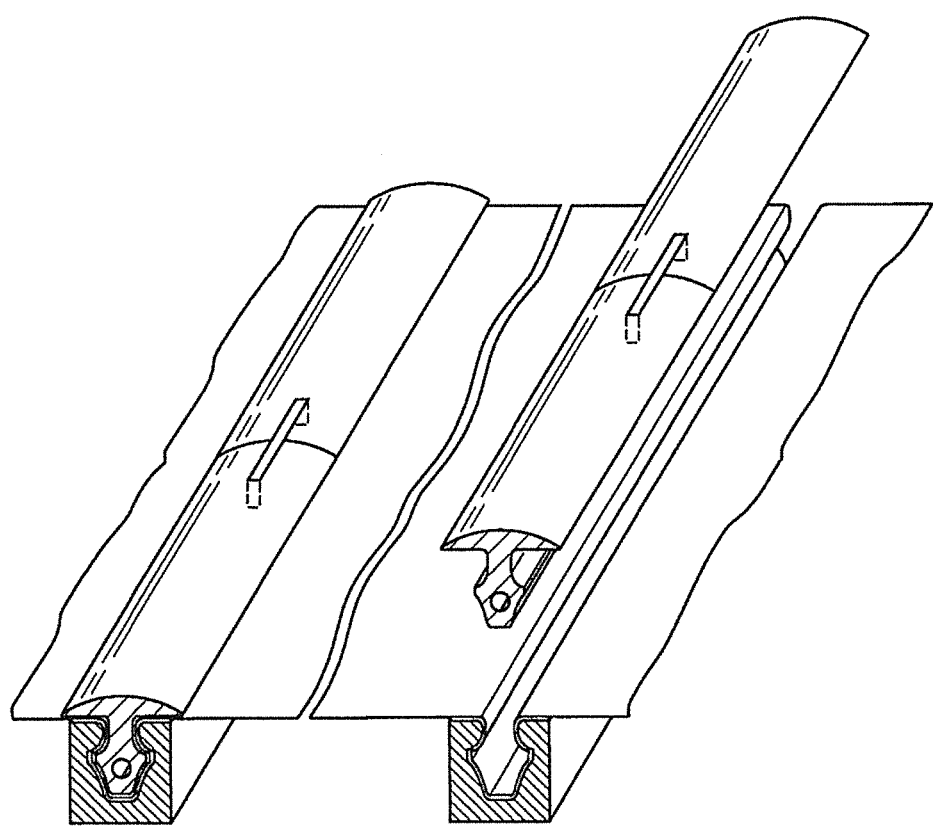
FIG. 7 is a perspective view of two profile elements joined by a clamp.

This piping connection allows for a stable connection e.g. with a fabric panel. At the same time, it is however also possible to displace the profile element 25 in the longitudinal direction of the cover device 1, making it possible to dispose the profile elements irregularly along the length of the, for example, tunnel-shaped cover device 1 with a closed profile. The ends of the piping element 28 can be connected, if the piping is not closed. FIG. 7 shows ends of piping connected to one another with a clamp.

Figure 3:
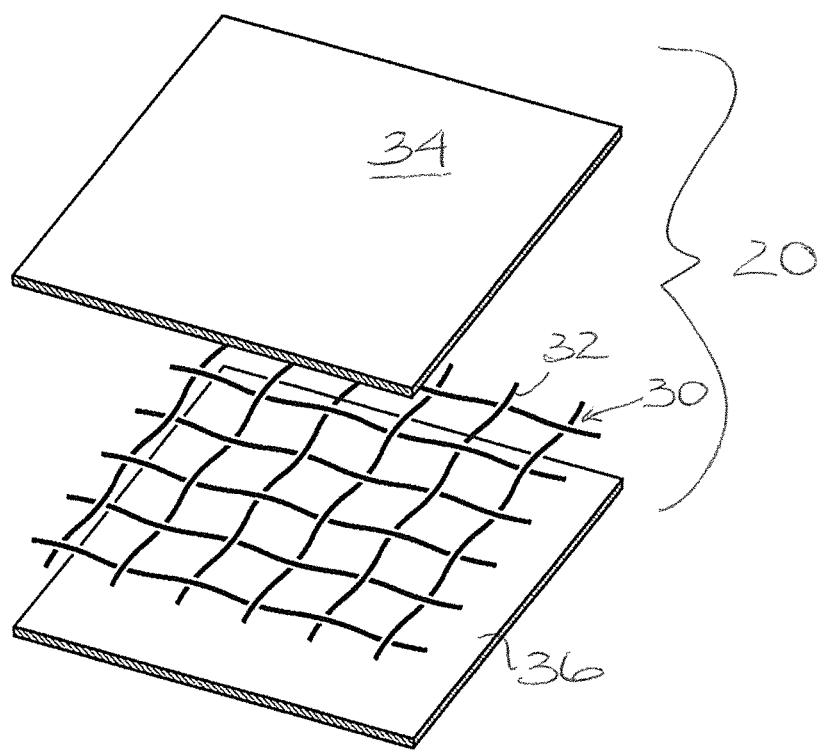
FIG. 3 is a perspective exploded view of a reinforcing element with a silicon rubber coating on both sides.

FIG. 3 shows an exemplary fabric panel 20 with the layers separated for clarity. A reinforcing element 30 takes the form or a woven fabric, a knitted fabric or a non-crimp fabric, formed of a plurality of threads or yarns 32, which may be formed of cross-linked silicone rubber. The reinforcing element 30 may have a coating 34 and/or 36 disposed thereon. The coating may be a cross-linked silicone rubber.

Figure 4:
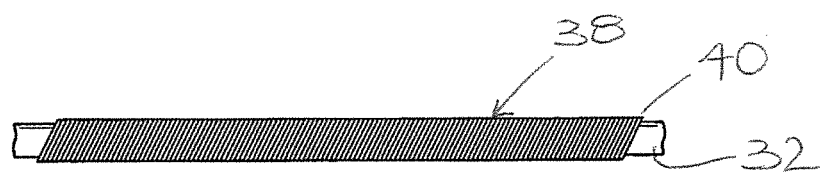
FIG. 4 is a view of a thread or yarn with a sheathing in the form of another thread.

FIG. 4 shows an individual thread or yarn 32 with a sheath 38, which may be formed of a synthetic material different than the threads or yarns 32. In the illustrated version, the sheath 38 is formed of a second thread 40 disposed about the thread or yarn 32, such as by wrapping or winding. The sheathing may be formed of a non-flammable or mostly non-flammable synthetic material.

Figure 5:
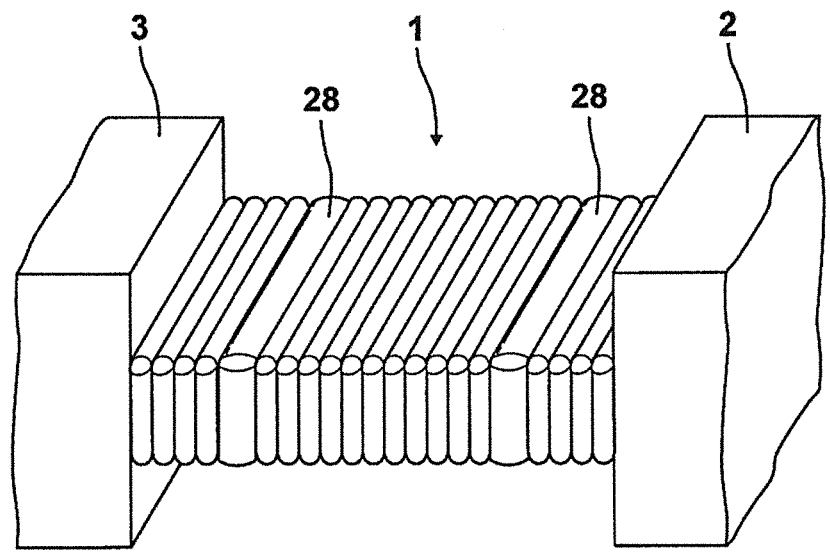
FIG. 5 is a perspective view of a corrugated cover device.
Figure 6:
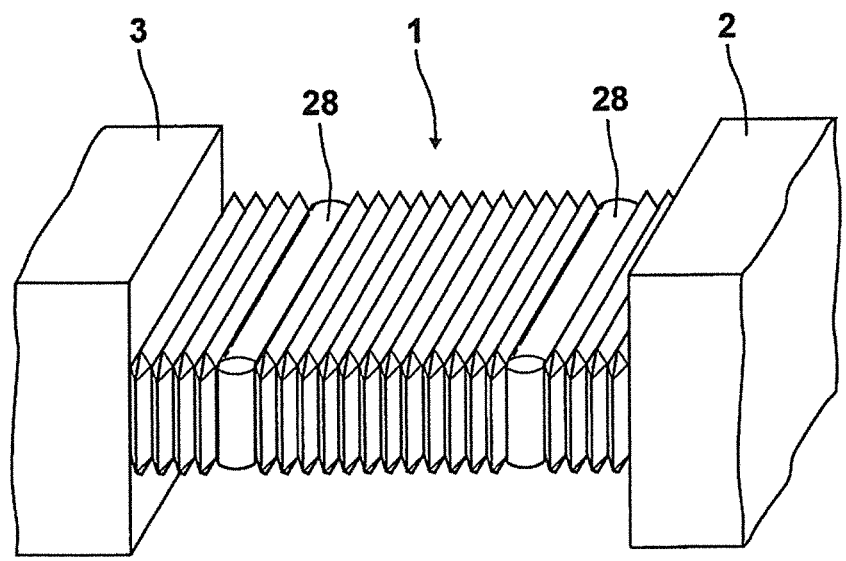
FIG. 6 is a perspective view of a pleated cover device.

The cover device may take a variety of forms. FIG. 5 shows a corrugated cover 1 with profile elements 28. FIG. 6 shows a pleated cover 1 with profile elements 28.

LIST OF REFERENCE NUMBERS 1 cover device
2 machine part
3 machine part
20 fabric panel
25 profile element
26 groove
28 piping element
28a schematic piping head
28b hollow space in the piping head
28c piping foot
28d substantially horizontal flange

The invention claimed is:

1. A cover device for movable installation parts or machine parts, the cover device comprising:
    a reinforcing element having a plurality of threads or yarns, the threads or yarns comprising cross-linked silicone rubber;
    at least one profile element that is detachably connectable with the cover device, the profile element having a groove defined therein; and
    a piping element engaging the groove so as to connect the cover device to the profile element such that the cover device is retained between the profile element and the piping element.

2. A cover device in accordance with claim 1, wherein the reinforcing element is a woven fabric, a knitted fabric or a non-crimp fabric.

3. A cover device in accordance with claim 1, further comprising a coating disposed on the reinforcing element.

4. A cover device in accordance with claim 3, wherein the coating comprises a cross-linked silicone rubber.

5. A cover device in accordance with claim 1, wherein the cover device has a U-shaped, box-shaped or sleeve-shaped cross section.

6. A cover device in accordance with claim 1, further comprising a sheathing disposed on the threads or yarns, the sheathing formed of a synthetic material different than the threads or yarns.

7. A cover device in accordance with claim 6, wherein the sheathing comprises a second thread disposed about the threads or yarns forming the reinforcing element.

8. A cover device in accordance with claim 6, wherein the sheathing is formed of a non-flammable or a mostly non-flammable synthetic material.

9. A cover device in accordance with claim 1, wherein the reinforcing element is a woven fabric, a knitted fabric or a non-crimp fabric that is elastically resilient in at least one spatial direction.

10. A cover device in accordance with claim 1, wherein the cover device has a corrugated or pleated configuration.

11. A cover device in accordance with claim 1, wherein the piping element is inserted into the groove of the profile element.

12. A cover device in accordance with claim 1, wherein the piping element is pressed into the groove of the profile element.

13. A cover device in accordance with claim 1, further comprising:
    a piping element that is received by the profile element;
    wherein the cover device has a longitudinal axis, the profile extending transverse to the longitudinal axis.

14. A cover device in accordance with claim 1, wherein the cover device is a tunnel-shaped circumferential cover with a closed profile.

15. A cover device in accordance with claim 1, wherein the piping element is elastic.

* * * * *